UNITED STATES PATENT OFFICE.

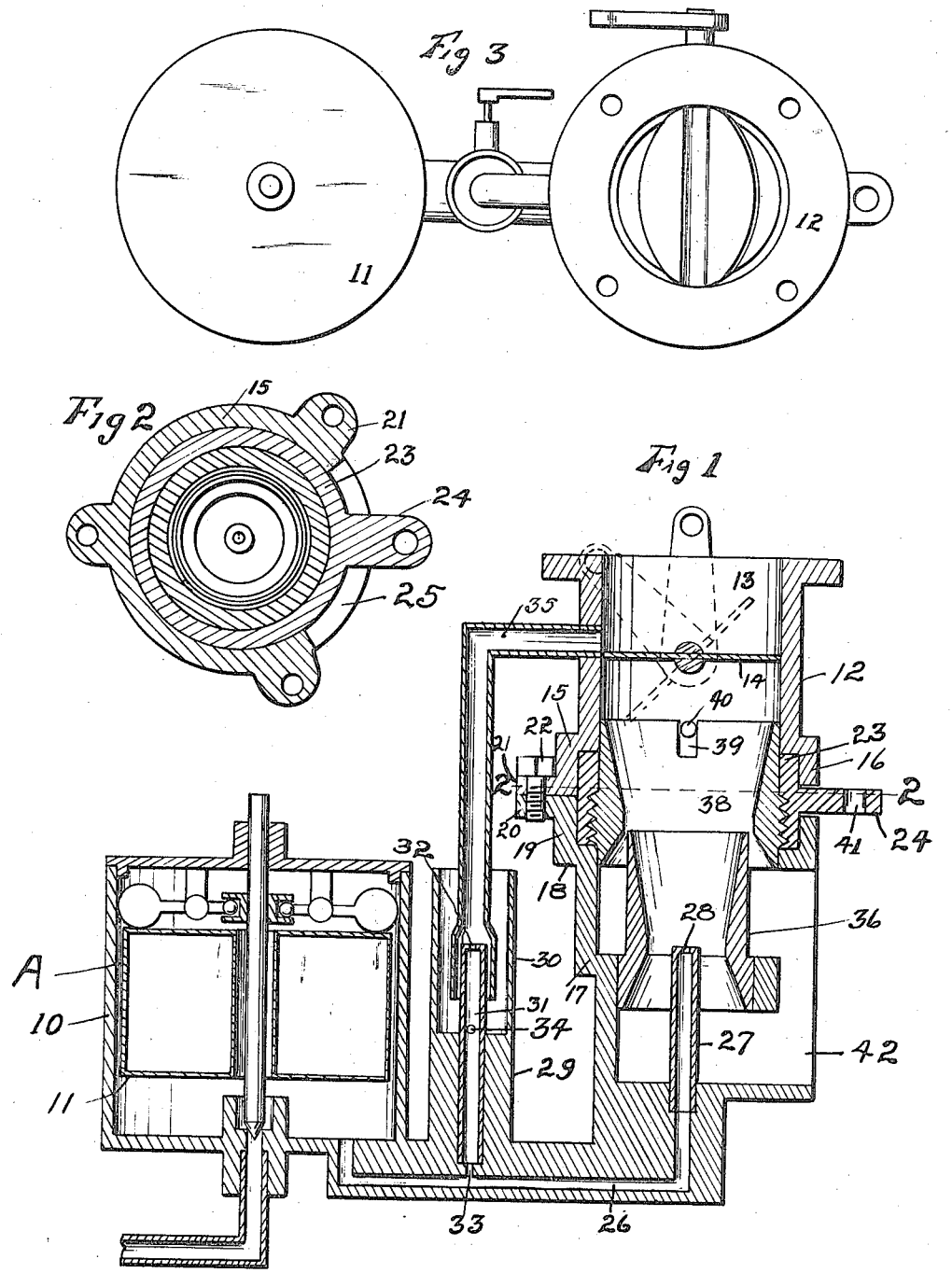

HAROLD E. McCRAY, OF CHARLES CITY, IOWA, ASSIGNOR TO WESTERN MOTOR APPLIANCE COMPANY, OF CHARLES CITY, IOWA.

CARBURETER.

1,153,436.   Specification of Letters Patent.   Patented Sept. 14, 1915.

Application filed February 9, 1914. Serial No. 817,716.

*To all whom it may concern:*

Be it known that I, HAROLD E. McCRAY, a citizen of the United States, and resident of Charles City, in the county of Floyd and State of Iowa, have invented certain new and useful Carbureters, of which the following is a specification.

The object of my invention is to provide a carbureter of new and novel construction adapted to secure a proper mixture of the air and fuel for an internal combustion engine.

A further object is to provide such a carbureter of novel construction adapted for regulating the volume of the air and fuel mixture supplied to the engine.

More particularly, it is my object to provide a carbureter having a fuel well connected with the supply tube between the controlling valve in the carbureter and the intake manifold for supplying a rich mixture when needed, and so arranged as to be inoperative when the engine is traveling at high speed or when the throttle valve is wide open.

Still a further object is to provide a carbureter employing a tube of the Venturi type around the fuel feed nozzle and a second similar tube adjustably mounted and inclosing the discharge end of the first Venturi tube for regulating the air supply and also the velocity of fuel and air in the first tube.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a vertical, central, sectional view through the carbureter, embodying my invention. Fig. 2 shows a horizontal, sectional view taken on the line 2—2 of Fig. 1, and Fig. 3 shows a top or plan view of my carbureter.

In the accompanying drawings I have used the reference numeral 10 to indicate generally the casing which incloses the float valve 11, which casing and valve may be of any suitable construction. I provide a carbureter shell 12 having a discharge passage 13 at its upper end, in which is mounted a throttle valve 14, which may be of the butterfly type. Near its lower end the shell 12 is provided with a laterally extending annular flange 15, at the outer edge of which is a downwardly extending flange 16. Below the shell 12 is a second shell portion 17, having near its upper end a laterally extending annular flange 18 at the outer edge of which is an upwardly extending annular flange 19. The flanges 16 and 19 are provided with adjacent laterally extending lugs 20 and 21 which are secured together by means of bolts 22. In the space between the flanges 15 and 18 is an annular sleeve 23 internally screw threaded and having at one side a laterally extending arm 24 which extends to a position outside the shell members through an elongated horizontal slot 25, formed in said shell members. In the lower portion or base of the shell member 17 is a passage 26, communicating with the lower interior of the shell 17 and with the lower interior of the casing 10 and forming a fuel passage from the casing 10 to the shell 17. Mounted in the lower end of the shell 17 and extending upwardly therein is a fuel supply tube 27, the upper end of which forms the fuel nozzle 28 and the lower end of which communicates with the passage 26. At a suitable point, preferably between the casing 10 and the shell 17, is an upwardly extending body 29. The upper portion of the body 29 forms a hollow cylinder or well 30. Mounted in the body 29 and extending to a point almost at the lower end thereof is a fuel supply pipe 31 at the upper end of which is a contracted opening 32, forming a nozzle. The lower end of the pipe 31 communicates by means of a contracted passage 33 with the passage 26. In the tube or passage 31 at the bottom of the well 30 is a small opening 34 whereby the interior of the tube 31 communicates with the interior of the well 30. Communicating with the interior of the discharge passage 13, at a point above the throttle valve 14, is a pipe 35 which extends downwardly into the well 30. The lower end of the pipe 35 incloses the surrounding upper portion of the tube 31 and is slightly spaced apart therefrom at all points, as shown in Fig. 1. The fuel in the casing 11 is designed to stand at a point, say for instance A, above the lower end of the pipe 35.

Mounted in the shell 17 is a tube 36 of the Venturi type. The upper end of the fuel feed nozzle 27 is preferably located at the narrowest point in the tube 36, which is the point of greatest velocity of air or gas passing through said tube 36. Mounted in the tubes 12 and 17, above the tube 36, is a larger tube 38 of the Venturi type, having external screw threads arranged to coact with the internal screw threads on the sleeve 23, as shown in Fig. 1. The wall of the tube 38 is provided with a vertical slot 39.

Extending inwardly from the wall of the shell 12 is a pin or lug 40, received in said slot 39 to permit the tube 38 to slide vertically and to prevent the rotation thereof.

It will readily be seen that by moving the arm 24 in a horizontal plane, the tube 38 may be raised or lowered. The arm 24 is provided with an opening 41 for the attachment of suitable controlling mechanism.

In the practical operation of my improved carbureter, the fuel will pass into the well 31 through the passage 33, the tube 31 and the hole 34 until it stands above the level of the lower end of the tube 35. When the engine is cranked a very rich mixture is drawn from the well through the tube 35, thereby emptying the well down to the lower end of said tube 35. As long as the throttle is almost closed the suction through the tube 35 remains great and draws a comparatively rich mixture into the intake. As the throttle valve is opened wider more air is admitted through the shell 17 and the suction upon the tube 35 is thereby decreased and the result is that less fuel is drawn from the well.

It will be understood that the shell 17 is provided with a large air opening 42. The construction of the double Venturi tubes is such that the air drawn through the tube 36 is at its greatest velocity when adjacent to the discharge end of the fuel feed nozzle 28. The tube 38 is so located that in one position of its movement the upper end of the tube 36 almost closes the tube 38 near the narrowest part thereof. The tube 38, however, may be adjusted by means of the arm 24 and the sleeve 23 for varying the size of the opening around the upper end of the tube 36, thereby affording an auxiliary air supply which may be accurately regulated. The upper end of the tube 36 being substantially at the point in the tube 38 where the auxiliary air is at its greatest velocity makes it possible to control and regulate to a large extent the velocity and volume of the mixture passing upwardly through the tube 36.

The fuel flow through the tube 35 is largely controlled by the size of the opening 33. The parts are so constructed that little fuel will be supplied through the tube 35 when the throttle 14 is opened wide, for the reason that fuel is supplied to the well but slowly. While the throttle 14 is opened wide, the well remains empty or almost so, and when the engine stops it fills up. When the engine is again started a rich mixture will then be supplied through the tube 35.

The use of the double Venturi tube construction makes it possible to secure a maximum suction and velocity around the main fuel supply nozzle 28 and to create and maintain a high velocity of the incoming mixture (by means of the second Venturi tube) and also regulate the auxiliary air as to volume and velocity and thereby regulate the volume and velocity of the mixture coming through the tube 36. The use of the springs for adjustment and the use of any delicate mechanism requiring adjustment by an expert are wholly avoided while at the same time I secure the rich mixture necessary for starting and when the engine is throttled down and a regulated mixture when the engine is traveling at a high speed.

It will of course be understood that suitable mechanism may be employed for controlling the auxiliary or second Venturi tube from the dash or the steering wheel.

It will be understood that some changes may be made in the details of this construction without departing from its essential features and it is my intent to cover by this application any such changes which may be included within the scope of the appended claims:

I claim as my invention:

1. In a carbureter, a carbureter shell having a discharge passage, a throttle valve in said passage, a fuel supply passage leading to the lower portion of said shell, a receptacle communicating with said last named passage, a float valve in said receptacle, a well, a tube therein having a nozzle formed at its upper end above the normal fuel level in the receptacle, said tube being provided with an opening near the bottom of said well, a restricted passage leading from said tube to the fuel supply passage, and a tube communicating with the interior of said shell between the throttle valve and the discharge end of the discharge passage, said tube being extended into said well downwardly over the nozzle in said well to a point below the normal fuel level in said casing.

2. In a carbureter a shell, a fuel supply tube, a Venturi tube surrounding the discharge end of said fuel supply tube, a second Venturi tube arranged with its lower end receiving the upper end of said first Venturi tube, and capable of longitudinal adjustment, means for manually vertically adjusting the second Venturi tube said means being adapted to hold said second Venturi tube in such adjusted position during the operation of the engine, said shell being provided with an air supply opening communicating with the Venturi tubes.

3. In a carbureter, a shell, a fuel supply tube extending into said shell, a Venturi tube surrounding the discharge end of the supply tube, a second Venturi tube arranged with its lower end receiving the upper end of the first Venturi tube, and being vertically adjustable, and means for manually adjusting said second Venturi tube from outside the carbureter, said means being adapted to hold such second tube in its adjusted positions against being effected by the operation of the engine.

4. In a carbureter, a carbureter shell having a discharge passage, a throttle valve in said passage, a fuel supply passage leading to the lower portion of said shell, a receptacle communicating with said last named passage, a float valve in said receptacle, a well, a tube therein having a nozzle formed at its upper end above the normal fuel level in the receptacle, said tube being provided with an opening near the bottom of said well, a restricted passage leading from said tube to the fuel supply passage, and a tube communicating with the interior of said shell between the throttle valve and the discharge end of the discharge passage, said tube being extended into said well downwardly over the nozzle in said well to a point below the normal fuel level in said casing, a fuel supply nozzle in said shell communicating with said fuel supply passage, a tube of the Venturi type inclosing said nozzle with the nozzle at the narrowest point of said Venturi tube, and a second Venturi tube surrounding the upper end of said first tube with said upper end approximately at the narrowest part of said second Venturi tube, and means for vertically adjusting said second Venturi tube.

5. In a device of the class described, a carbureter shell having a discharge passage, a throttle valve therein, a fuel supply nozzle in said shell, a fuel supply passage communicating with said nozzle, a well adjacent to said shell, open at its upper end and communicating at its lower end by a restricted passage with said fuel supply passage, a fuel tube communicating with said restricted passage and extending upwardly in said well and having a nozzle open at its upper end, an opening at the bottom of said well, and a tube communicating with said discharge passage between the throttle and the discharge end of said passage and extending into said well and surrounding the upper end of said last named fuel supply tube.

Des Moines, Iowa, December 22, 1913.

HAROLD E. McCRAY.

Witnesses:
H. L. LOCKWOOD,
GLADEP F. M. BEARDMORE.